United States Patent [19]

Tatara

[11] Patent Number: 4,858,100
[45] Date of Patent: Aug. 15, 1989

[54] ELECTRIC POWER CONVERTER

[75] Inventor: Shinji Tatara, Tokyo, Japan

[73] Assignee: Kabushiki Kaisha Toshiba, Kawasaki, Japan

[21] Appl. No.: 174,903

[22] Filed: Mar. 29, 1988

[30] Foreign Application Priority Data

Mar. 30, 1987 [JP] Japan .................................. 62-074304

[51] Int. Cl.⁴ .......................................... H02M 5/257
[52] U.S. Cl. .................... 363/161; 363/164; 363/39; 323/207; 323/212; 318/729; 318/799; 318/809
[58] Field of Search ................. 363/39, 159, 160, 161, 363/164, 165; 323/205, 207, 212; 318/729, 799, 800, 807, 809

[56] References Cited

U.S. PATENT DOCUMENTS

| 4,303,972 | 12/1981 | Stacey et al. | 363/161 |
| 4,529,925 | 7/1985 | Tanaka et al. | 363/161 |
| 4,600,874 | 7/1986 | Tupper et al. | 323/207 |
| 4,647,837 | 3/1987 | Stemmler | 323/207 |

Primary Examiner—Peter S. Wong
Attorney, Agent, or Firm—Foley & Lardner, Schwartz, Jeffery, Schwaab, Mack, Blumenthal & Evans

[57] ABSTRACT

An electric power converter, in which a plurality of converters convert a first electric power having a first frequency into a second electric power having a second frequency, and the second electric power is supplied to a load such as an electric motor, and in which a correction controller changes a reference voltage to generate reference voltage signals to be supplied to the converters in order to shift firing phase angles of the converters, thereby preventing a generation of higher harmonics of integer orders of the first electric power.

10 Claims, 4 Drawing Sheets

OUTPUT VOLTAGE OF POSITIVE CONVERTER DEVICE 1

OUTPUT VOLTAGE OF NEGATIVE CONVERTER DEVICE 2

OUTPUT VOLTAGE OF REACTOR 4

→ TIME

ELECTRIC POWER CONVERTER

BACKGROUND OF THE INVENTION

1. Field of the Invention

The present invention relates to an electric power converter for converting an alternating electric power having a frequency into another alternating electric power having another frequency.

2. Description of the Prior Art

In FIG. 1, there is shown a conventional circulating current type cycloconverter for driving a three-phase electric motor 6 as an electric power converter. The cycloconverter comprises three positive converter devices 1 for passing a positive side of an output current, three negative converter devices 2 for passing a negative side of the output current, three pairs of three-phase transformers 3 whose primary coils are connected to an alternating electric power source (not shown) and whose secondary coils are connected to the positive and negative converter devices 1 and 2, three reactors 4 connected to the outputs of the positive and negative converter devices 1 and 2, for restraining circulating currents flowing in the positive and negative converter devices 1 and 2 and the transformers 3, and a phase-leading capacitor 5 connected to the primary coils of the transformers 3. Neutral or middle points of the reactors 4 are connected to three coils of the three-phase electric motor 6. Each positive converter device 1 comprises a pair of converters 7 and 8 connected to each other in series in two stages, and each negative converter device 2 comprises a pair of converters 9 and 10 connected to each other in series in two stages. A semiconductor element or a switching semiconductor element such as a gate turnoff element or a thyristor may be properly used for the converter. Further, the positive converter devices 1, the negative converter devices 2 and the transformers 3 are arranged and connected corresponding to three phases U, V and W.

A principle of an action of the cycloconverter described above will be described in detail.

Each positive converter device 1 and each negative converter device 2 output respective voltages in the same time, and an average voltage of these two voltages is applied through each reactor 4 to each coil of the motor 6. Symmetrical three-phase sinusoidal voltages having a certain frequency are output from the three pairs of converter devices 1 and 2 through the reactors 4, and the phases of the three-phase voltages are shifted 120 degree from one to another. Thus, three-phase sinusoidal currents are fed to the three coils of the motor 6 for driving the same. At this time, a voltage difference (the output voltage of the positive converters device 1 is equal to or larger than the output voltage of the negative converters device 2) arises between the output voltages of the positive and negative converter devices 1 and 2, and hence the circulating current flows in a closed circuit composed of the positive converter device 1, the reactor 4, the negative converter device 2 and the transformers 3.

In this cycloconverter, since a large reactive power is generated, in order to compensate this reactive power, the phase-leading capacitor 5 is connected to the primary coils of the transformers 3, thereby improving an input power factor. However, the reactive power generated in the cycloconverter varies depending on its operational conditions, and thus the input power factor cannot be maintained to be high in an entire operation range by a phase-leading capacitor having a certain value. Then, in order to solve this problem, the circulating currents or the reactive power which cannot contribute to the output of the motor, is so controlled to be a certain value, that the sum of the reactive power of the circulating currents and the reactive power generated in the cycloconverter may be a predetermined value. On this occasion, the capacity of the phase-leading capacitor 5 is selected so as to nullify the controlled whole reactive power, resulting in that it may be possible to operate the cycloconverter always at a high power factor such as the power factor in the entire operation range.

Next, a relation between the wire connections of the transformer 3 and the action of the cycloconverter will be described with reference to FIGS. 2 and 3.

As shown in FIG. 2, each of the transformers 3 includes one delta connection in one secondary coil and two star connections in the primary coil and the other secondary coil, and the phases of the voltages supplied to the converters 7 and 10 connected to the delta connection secondary coils are shifted to $-30°$ with reference to those of the star connection primary coils while the phases of the voltages supplied to the converters 8 and 9 connected to the star connection secondary coils are the same as those of the star connection primary coils. For instance, the phases of the voltages supplied to the converters 7, 8, 9 and 10 are $-30°$, $0°$, $0°$ and $-30°$, respectively.

In FIG. 3, there are shown three wave forms of the voltages at the outputs of the positive converter device 1 and the negative converter device 2 and at the neutral point of the reactor 4. The voltage having 30° phase 12 pulses is output from the positive or negative converter device 1 or 2. At this time, the voltage to be supplied to the motor 6 or at the neutral point of the reactor 4 becomes the naught voltage on an average, as shown in FIG. 3. Hence, the motor 6 is not driven but is stopped, and only the circulating currents corresponding to the phase-leading capacitor 5 circulates in the circuits.

In the above-described conventional cycloconverter, since there is no current to be supplied to the motor upon stopping the motor, the reactive power corresponding to the phase-leading capacitor is all generated by only flowing the circulating currents. In this case, large currents flow only in the closed circuits each composed of the positive converter device 1, the reactor 4, the negative converter device 2 and the transformers 3. A large quantity of higher harmonics of $6n \pm 1$ orders, wherein n is an integer, are generated.

In general, in the main circuit connection shown in FIG. 1, since a winding phase of one secondary coil of the transformer 3 is shifted to 30°, the higher harmonics of $12n \pm 1$ orders, in which n is an integer, are generated. Further, it is generally known that the amount of the current of the generated higher harmonic is $1/(6n \pm 1)$ time, in which n is an integer, as much as that of a fundamental wave. This current of the higher harmonic brings about a distortion or deformation of a voltage wave form of the electric power source, resulting in giving bad influences to electric equipments, apparatus or machinery connected to the same electric power source. For example, the current of the higher harmonics of the eleventh and thirteenth orders cause an overcurrent of a rated current of a resistor in an electric power source system, with the result of generating an overheat.

SUMMARY OF THE INVENTION

Accordingly, it is an object of the present invention to provide an electric power converter, free from the aforementioned disadvantages and defects of the prior art, which is capable of being controllable so as to prevent a generation of higher harmonics or to reduce a quantity of the generation of the higher harmonics and of always maintaining a high input power factor.

In accordance with one aspect of the present invention, there is provided an electric power converter comprising a plurality of means for converting a first electric power having a first frequency into a second electric power having a second frequency, the second electric power being supplied to a load, and correction control means for changing a reference voltage to generate reference voltage signals to be supplied to the converting means in order to shift firing phase angles of the converting means, thereby preventing a generation of higher harmonics of integer orders of the first electric power.

BRIEF DESCRIPTION OF THE DRAWINGS

The above and other objects, features and advantages of the present invention will more fully appear from the following description of its preferred embodiments with reference to the accompanying drawings, in which.

DESCRIPTION OF THE PREFERRED EMBODIMENTS

Figure 1:
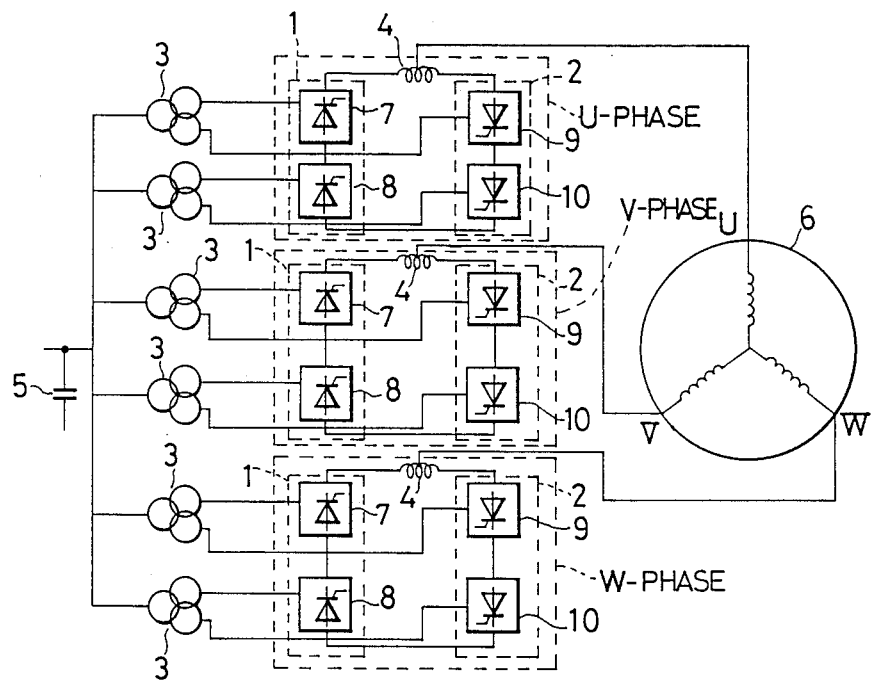
FIG. 1 is a circuit diagram of a conventional circulating current type cycloconverter for driving a three-phase electric motor.

The present invention will now be described in detail with reference to the accompanying drawings, wherein like reference characters denote like or corresponding parts throughout the several views.

First, the principal concept of the present invention will be described in connection with FIGS. 7 and 8.

According to the present invention, an output voltage having 12 pulses is amended to an output voltage having 24 pulses by using a correction controller of an electric power converter according to the present invention, as hereinafter described in detail with reference to its preferred embodiments.

Figure 2:
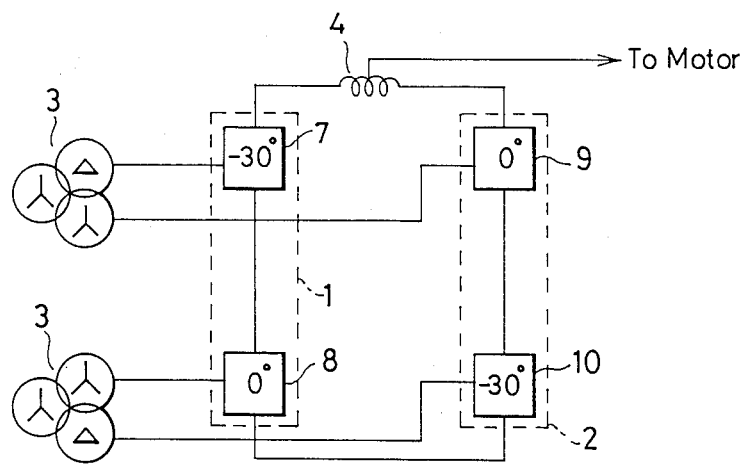
FIG. 2 is a fragmentary circuit diagram of converter devices and transformers connected thereto for one phase of the conventional cycloconverter of FIG. 1 for explaining a relation of phases of converters.
Figure 3:
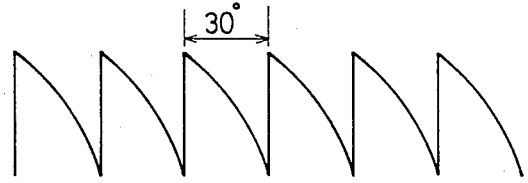
FIG. 3 is a wave form chart of output voltages of positive and negative converter devices and a reactor of FIG. 2.
Figure 3:
Figure 3:
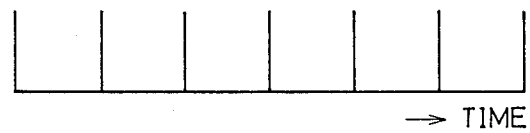
Figure 7:
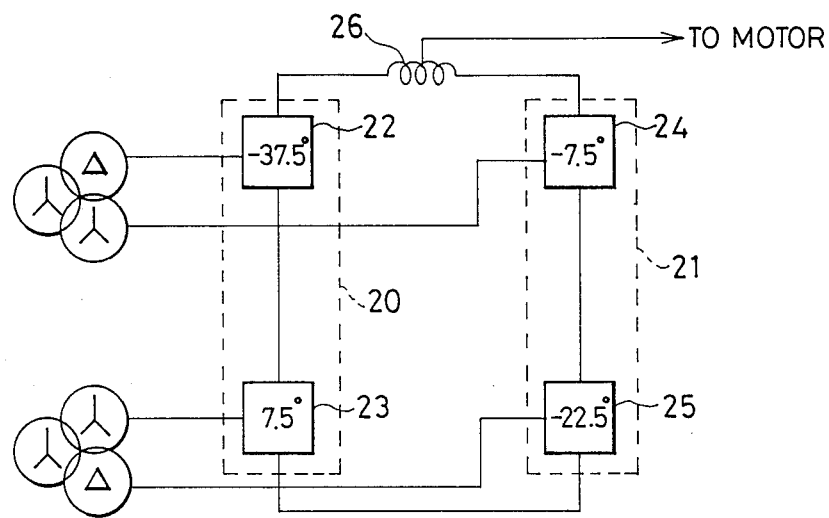
FIG. 7 is a fragmentary circuit diagram of four converters having different phases and two transformers connected thereto of an electric power converter according to the present invention for explaining a function of a correction controller thereof.

That is, in order to amend the output voltage having 12 pulses into the output voltage having 24 pulses, reference voltages to be applied to converters such as switching semiconductor elements are so amended that, as shown in FIG. 7, a phase difference $\pm 7.5°$ may be added to converters 22, 23, 24 and 25 of positive and negative converter devices 20 and 21, while the initial phases of the converters are $-30°$, $0°$, $0°$ and $-30°$, respectively, as shown in FIG. 2, thereby obtaining the output voltage having 24 pulses at an neutral point of a reactor 26.

In other words, the correction controller controls the phases of the converters 20, 21, 22 and 23 so that the phases of the converters 20, 21, 22 and 23 may be amended to $-37.5°$ ($=-30°-7.5°$), $+7.5°$ ($=0°+7.5°$), $-7.5°$ ($=0°-7.5°$) and $-22.5°$ ($=-30°+7.5°$), respectively. In this case, the phase differences among the output voltages of the converters 20, 21, 22 and 23 are always 15°.

Figure 8:
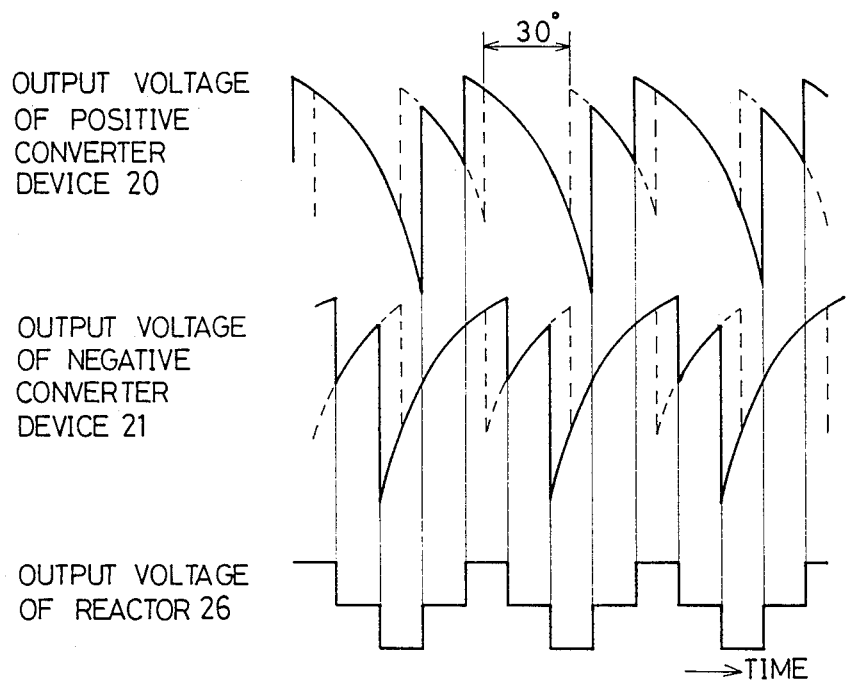
FIG. 8 is a wave form chart of output voltages of positive and negative converter devices and a reactor shown in FIG. 7.

In FIG. 8, there are shown three wave forms of the output voltages of the positive and negative converter devices 20 and 21 and of the neutral point of the reactor 26. It is readily understood from these three wave forms that the output voltage having 24 pulses with reference to the input electric power source can be output at the neutral point of the reactor 26. Further, the voltage supplied from the positive and negative converter devices 20 and 21 to a load such as an electric motor connected thereto via the reactor 26 becomes the naught on an average. Therefore, no influence is affected to a conventional voltage output system and to the operational characteristics of the load, and hence the quantity of the generation of the higher harmonics of $12n\pm 1$ orders of the output voltage having 12 pulses of the conventional electric power converter, in particular, the higher harmonic of eleventh order may be effectively reduced. Theoretically, in this embodiment, the higher harmonics of $24n\pm 1$ orders are generated, and the higher harmonic components of the eleventh and thirteenth orders of the conventional electric power converter are mutually nullified to be the naught, with the result of maintaining a high input power factor.

The present invention will be described in detail with reference to its preferred embodiments, taken in connection with FIGS. 4–6.

Figure 4:
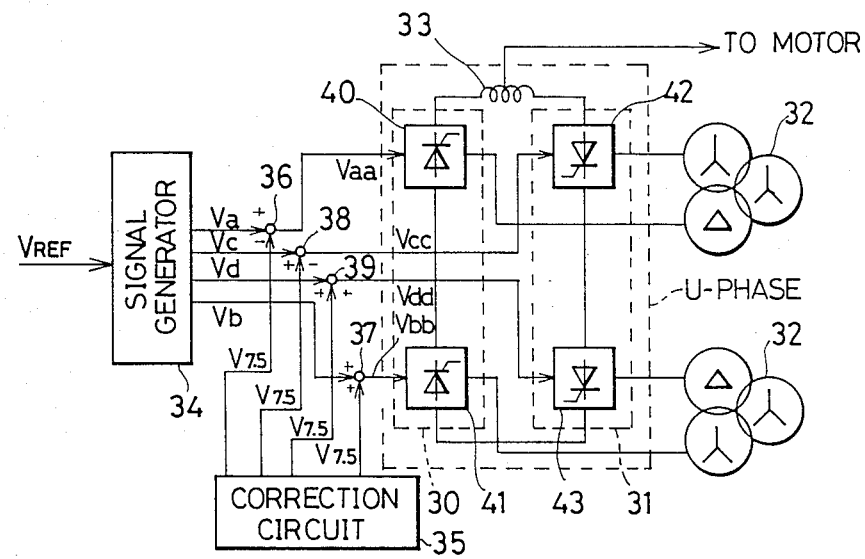
FIG. 4 is a framentary circuit diagram of a first embodiment of an essential part for one phase of an electric power converter according to the present invention.

In FIG. 4, there is shown a first embodiment of an essential part for one phase such as a U-phase of a three-phase-bridge circulating current type cycloconverter to which an electric power converter according to the present invention is applied, in which parts, each having the same construction as the above part for the U-phase, for the two other phases such as a V-phase and a W-phase are omitted for the brevity of the description.

In the drawing, the cycloconverter for the U-phase comprises a positive converter device 30 including a pair of converters 40 and 41 connected to each other in series in two stages, for flowing a positive side of an output current, a negative converter device 31 including a pair of converters 42 and 43 connected to each other in series in two stages, for flowing a negative side of the output current, a pair of three-phase transformers 32, each having one delta connection in a secondary coil and two star connections in the other secondary coil and the primary coil, the secondary coils being connected to the positive and negative converters 40, 41, 42 and 43, a reactor 33 connected to the outputs of the positive and negative converter devices 30 and 31, for restraining circulating currents flowing in the converter devices 30 and 31, the transformers 32 and the reactor 33, a reference voltage signal generator 34 which receives a reference voltage Vref and outputs reference voltage signals Va, Vb, Vc and Vd in consideration of firing pulse output phases of the respective converters 40, 41, 42 and 43 of the positive and negative converter devices 30 and 31, a correction circuit 35 for generating a phase-correction signal P corresponding to a phase to be shifted with reference to the reference voltage signals, and adders 36, 37, 38 and 39 which add the reference voltage signals and the phase-correction signals and output corrected reference voltage signals Vaa, Vbb, Vcc and Vdd to the converters 40, 41, 42 and 43, respectively.

In this cycloconverter described above, the reference voltage Vref is fed to the reference voltage signal generator 34, and the reference voltage signal generator 34 outputs the reference voltage signals Va, Vb, Vc and Vd to the converters 40, 41, 42 and 43, respectively, in consideration of the firing pulse output phases of the respective converters 40, 41, 42 and 43. At this time, the phases of the converters 40, 41, 42 and 43 are $-30°$, $0°$, $0°$ and $-30°$, respectively, in order of the reference voltage signals Va, Vb, Vc and Vd, in synchronism with the electric power source system.

To the converters 40, 41, 42 and 43, the correction circuit 35 now outputs the phase-correction signal P corresponding to a phase angle 7.5° to be shifted in order to shift the firing phase angles of the converters. At this time, the correction circuit 35 acts as follows.

The relation among the phase angle $\alpha$ the reference voltage Vref of the converter and the maximum output voltage Vmax of the converter is expressed in the following formula.

$$Vref = Vmax \times \cos \alpha$$

Therefore, in order to amend the phase angle of 7.5°, it is apparent from the above formula that the reference voltage Vref of the converter is determined to Vmax. cos 7.5, hereinafter referred to as $V_{7.5}$, and hence the correction circuit 35 outputs the calculated value $V_{7.5}$ as the phase-correction signal P. A microcomputer may be suitably used as the correction circuit 35.

The, the reference voltage signals Va, Vb, Vc and Vd are amended by adding or subtracting the value $V_{7.5}$ to or from the adders 36, 37, 38 and 39, respectively, to obtain the following corrected reference voltage signals.

$$Vaa = Va - V_{7.5}$$

$$Vbb = Vb + V_{7.5}$$

$$Vcc = Vc - V_{7.5}$$

$$Vdd = Vc + V_{7.5}$$

These corrected reference voltage signals Vaa, Vbb, Vcc and Vdd are to be supplied to the converters 40, 41, 42 and 43, respectively, in order to shift the firing phase angles of the converters.

Thus, the phases of the corrected reference voltage signals Vaa, Vbb, Vcc and Vdd to be supplied to the converters 40, 41, 42 and 43 are determined to $-37.5°$ ($=-30°-7.5°$), $+7.5°$ ($=0°+7.5°$), $-7.5°$ ($=0°-7.5°$) and $-22.5°$ ($=-30°+7.5°$), respectively, and hence the phase differences among the output voltages of the converters 40, 41, 42 and 43 becomes 15°. Accordingly, an output voltage having 24 pulses with reference to the input electric power source is output from the neutral point of the reactor 33, and the load such as the electric motor (not shown) can be driven by the output voltage having 24 pulses.

In this embodiment, it is readily understood that, since the output voltage having 12 pulses is amended to the output voltage having 24 pulses by means of the correction circuit 35 together with the reference voltage signal generator 34 and the adders 36–39, the higher harmonics of $24n\pm 1$ orders are generated, and the generation of the higher harmonics of $12n\pm 1$ orders such as eleventh and thirteenth orders of the output voltage having 12 pulses can be effectively prevented.

Figure 5:
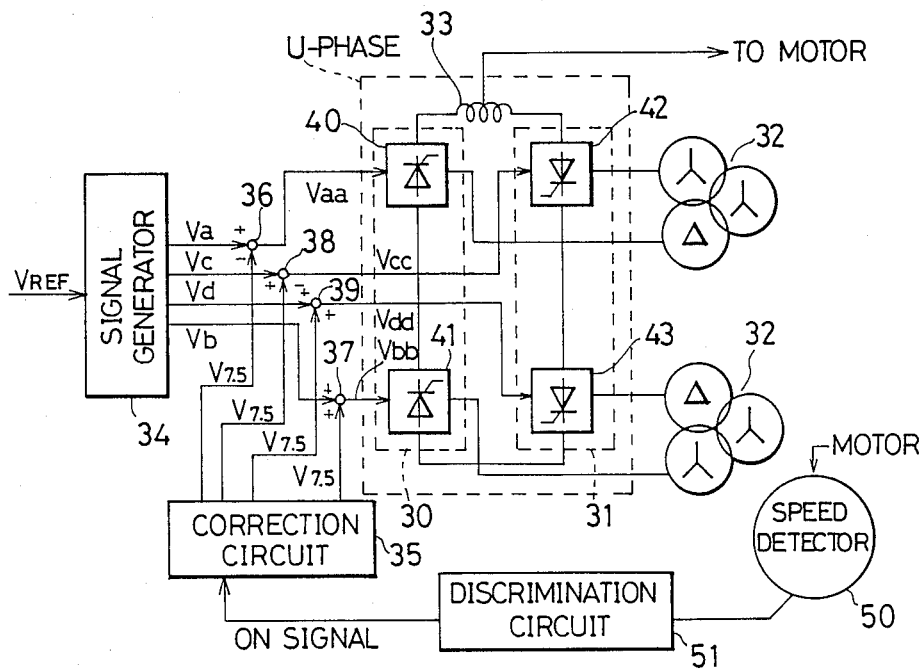
FIG. 5 is a fragmentary circuit diagram of a second embodiment of an essential part for one phase of an electric power converter according to the present invention.

Then, in FIG. 5, there is shown a second embodiment of an electric power converter according to the present invention. In this embodiment, the electric power converter has the same construction as that of the first embodiment shown in FIG. 4, except that a speed detector 50 and a discrimination circuit 51 are further provided, and the correction circuit 35 is actuated, for example, in accordance with the speed of the electric motor as the load.

In this case, as shown in FIG. 5, the speed detector 50 detects the speed of the motor as the load in a conventional manner and outputs a detection signal to the discrimination circuit 51. Then, the discrimination circuit 51 discriminates whether the speed of the discrimination signal belongs to a low speed range or not, and, when the discriminated speed comes within the low speed range, the discrimination circuit 51 outputs an ON signal to the correction circuit 35 for actuating the same. when the correction circuit 35 receives the ON signal from the discrimination circuit 51, the correction circuit 35 outputs the phase-correction signal P to the adders 36–39. On the other hand, when the discriminated speed does not come within the low speed range, the discrimination circuit 51 outputs no signal to the correction circuit 35, and the correction circuit 35 is not actuated.

The electric power converter of the present invention is particularly effective when the speed of the motor driven thereby is slow, and is substantially unnecessary when the motor is rotated at a regular speed. In this embodiment, when the motor is operated at a high speed by using a high secondary voltage supplied from a transformer, no voltage shortage arises by properly determining the low speed range. In this embodiment, of course, the same effects and advantages as those of the first embodiment can be obtained.

Figure 6:
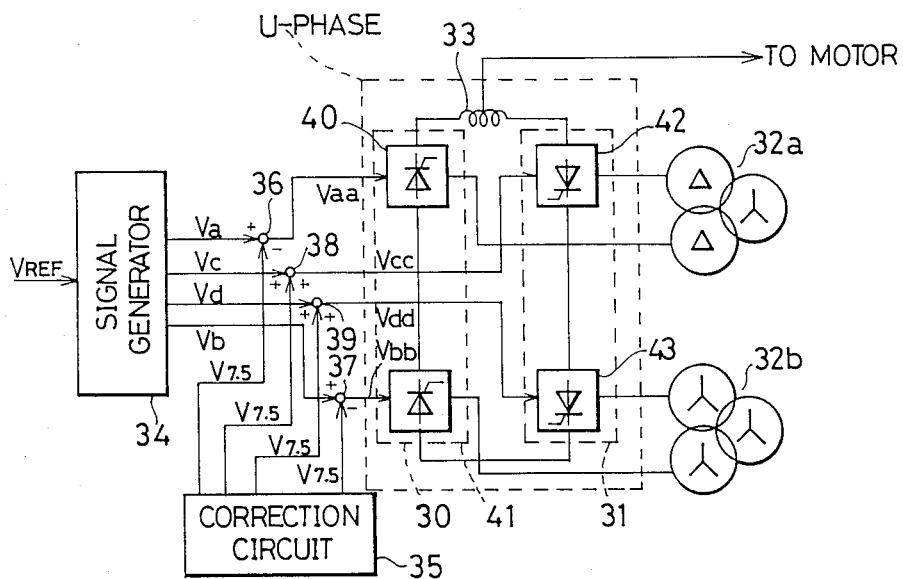
FIG. 6 is a fragmentary circuit diagram of a third embodiment of an essential part for one phase of an electric power converter according to the present invention.

Next, in FIG. 6, there is shown a third embodiment of an electric power converter according to the present invention. In this embodiment, the electric power converter has the same construction as that of the first embodiment shown in FIG. 4, except that transformers 32a and 32b, one 32a having one star connection in the primary coil and two delta connections in the two secondary coils, the other 32b having three star connections in the primary coil and the two secondary coils, are used.

In this case, as shown in FIG. 6, the initial phases of the converters 40, 41, 42 and 43 of the positive and negative converter devices 30 and 31 are $-30°$, $0°$, $-30°$ and $0°$, respectively. Accordingly, the amendments in the adder 36, 37, 38 and 39 are somewhat different from those of the first embodiment described above. That is, the corrected reference voltage signals Vaa, Vbb, Vcc and Vdd to be supplied to the converters 40, 41, 42 and 43, respectively, are obtained as follows, wherein Va, Vb, Vc and Vd represent the reference voltage signals which are output from the reference voltage signal generator 34 and are fed to the adders 36, 37, 38 and 39, and $V_{7.5}$ represents the phase-correction signal P output from the correction circuit 35.

$$Vaa = Va - V_{7.5}$$

$$Vbb = Vb - V_{7.5}$$

$$Vcc = Vc + V_{7.5}$$

$$Vdd = Vd + V_{7.5}$$

Therefore, the phases of the corrected reference voltage signals Vaa, Vbb, Vcc and Vdd to be fed to the converters 40, 41, 42 and 43 are determined to $-37.5°$ ($=-30°-7.5°$), $-7.5°$ ($=0°-7.5°$), $-22.5°$ ($=-30°+7.5°$) and $+7.5°$ ($=0°+7.5°$), respectively, and thus the phase differences among the output voltages of the converters 40, 41, 42 and 43 becomes always 15°. Hence, an output voltage having 24 pulses is output at the neutral point of the reactor 33, and the motor can be driven by the output voltage having 24 pulses. In this embodiment, the same effects and advantages as those of the first embodiment can be obtained.

It is readily understood from the description of the preferred embodiments of the present invention that, according to the present invention, the adding relation between the reference voltage signals Va, Vb, Vc and Vd and the phase-correction signal P may be suitably varied depending on the wire connection of the primary and secondary coils of the transformers in consideration of the phases of the converters, resulting in obtaining the output voltage having 24 pulses.

Although the present invention has been described in its preferred embodiments, in which the phase-correction signal corresponding to the phase angle 7.5° is used as a fixed value, however, the phase angle or the correction amount of the phase-correction signal output from the correction circuit may be, of course, varied and supplied to converters connected to one another in series in multi-stages. Further, although the present invention has been described with reference to the circulating current type cycloconverter, of course, the present invention may be applied to an electric power converter including converters connected to one another in series in the multi-stages, in which the output voltages are output from the positive and negative converter devices in the same time. The electric power converter of the present invention can be effectively used for a power source of a linear motor and so forth. Further, it is readily understood that the part for the one phase such as U-phase of the electric power converter of the present invention can be, of course, used for a power source of a direct current machine or the like.

It is readily understood from the above description that the phases of the converters are changed, i.e., the firing phase angles of the converters are shifted to the predetermined amounts by amending the firing phases to obtain the output voltage having a twice number of pulses, resulting in that the generation of the higher harmonics of the previous orders may be effectively prevented.

Although the present invention has been described in its preferred embodiments with reference to the accompanying drawings, it is readily understood that the present invention is not restricted to the preferred embodiments of the present invention and that various changes and modifications may be made in the present invention by a person skilled in the art without departing from the spirit and scope of the present invention.

What is claimed is:

1. An electric power converter comprising:
   a plurality of means for converting a first electric power having a first frequency into a second electric power having a second frequency and having output voltages with a plurality of phases, the second electric power being supplied to a load; and
   correction control means for changing a reference voltage to generate phase angle shift signals to be supplied to the converting means in order to shift firing phase angles of the converting means so that phase differences among the output voltages of the second electric power will be 15°, thereby preventing a generation of higher harmonics of integer orders of the first electric power.

2. A power converter as defined in claim 1, further comprising:
   means for detecting an operational condition of the load to output a detection signal; and
   means for discriminating a timing for actuating the correction control means in accordance with the detection signal output from the detecting means.

3. A power converter as defined in claim 2, wherein the converting means includes positive and negative converter devices for converting positive and negative sides of the first electric power, a pair of transformers having secondary coils connected to the positive and negative converter devices, and a reactor having a neutral point, connected to outputs of the positive and negative converter devices, the second electric power being output from the neutral point of the reactor.

4. A power converter as defined in claim 3, wherein each of the positive and negative converter devices includes a pair of converters connected to each other in series.

5. A power converter as defined in claim 4, wherein the correction control means includes a signal generator for generating the reference voltage signals, a correction circuit for outputting a phase-correction signal corresponding to a phase to be shifted, and adders for adding the phase-correction signal to the reference voltage signals to output the phase angle shift signals to the converters.

6. A power converter as defined in claim 5, wherein the phases of the corrected reference voltage signals to be supplied to the converters include $-37.5°$, $+7.5°$, $-7.5°$ and $-22.5°$.

7. A power converter as defined in claim 4, wherein the correction control means includes a singal generator for generating the reference voltage singals, a correction circuit for outputting a phase-correction signal corresponding to a phase to be shifted, and adders for adding the phase-correction signal to the reference voltage signals to output the phase angle shift signals to the converters.

8. A power converter as defined in claim 7, wherein the detecting means includes a speed detector for detecting a speed of an electric motor as the load, and the discriminating means includes a discrimination circuit for actuating the correction circuit in accordance with the detection signal output from the speed detector.

9. A power converter as defined in claim 8, wherein the phases of the corrected reference voltage signals to be supplied to the converters include $-37.5°$, $+7.5°$, $-7.5°$ and $-22.5°$.

10. A power converter as defined in claim 2, wherein the converting means includes positive and negative converter devices for converting positive and negative sides of the first electric power, a pair of transformers having secondary coils connected to the positive and negative converter devices, and a reactor having a neutral point, connected to outputs of the positive and negative converter devices, the second electric power being output from the neutral point of the reactor.

* * * * *